Figure 1:
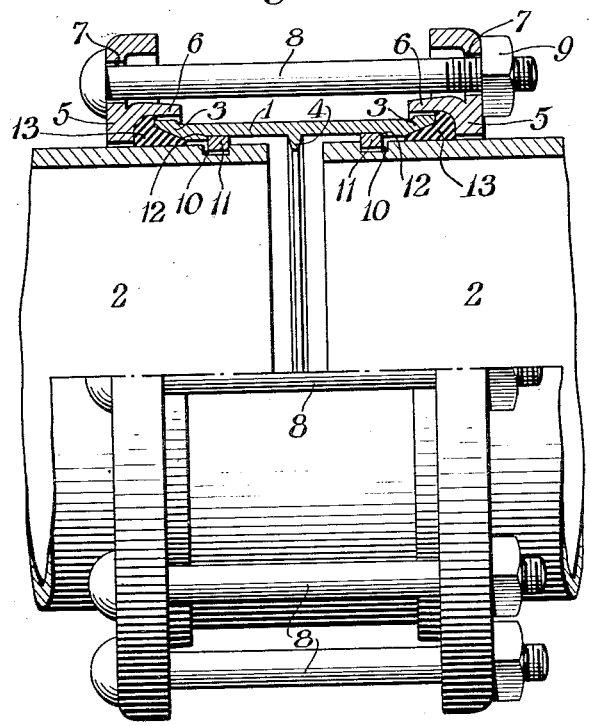

Nov. 22, 1932.　　　　J. CLARK　　　　1,888,260

PIPE COUPLING FOR PLAIN END PIPES

Filed Feb. 6, 1930

INVENTOR
James Clark
BY
ATTORNEY

Patented Nov. 22, 1932

1,888,260

UNITED STATES PATENT OFFICE

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

PIPE COUPLING FOR PLAIN END PIPES

Application filed February 6, 1930. Serial No. 426,214.

My invention consists in the novel features hereinafter described, reference being had to the accompanying drawing, which illustrates an embodiment of the same, selected by me for purposes of illustration, and the said invention is fully disclosed in the following description and claims.

My present invention is an improvement in pipe couplings for plain end pipes, in which a compressible packing ring, usually formed of rubber or other suitable material, is compressed between the exterior of the plain, unthreaded end of a pipe section, and a cylindrical enclosing member, by means of a clamping ring and clamping bolts and nuts, so as to form a gas-tight joint. One of the advantages of this type of coupling is that a slight endwise movement of the pipe with respect to the enclosing coupling member, sufficient to accommodate the expansion and contraction of the pipe sections in a pipe line is permitted without danger of leakage. Another advantage is that the cost of threading the end of the pipe section which enters the coupling member, is eliminated.

The object of my present invention is to prevent the possibility of the pipe becoming disengaged from the enclosing coupling member by longitudinal strain to which the pipe line may be subjected, or by internal pressure in the pipe line, so as to produce a leak. To this end I provide locking means for positively connecting the pipe end with the cylindrical coupling member which encloses it, while at the same time permitting sufficient longitudinal movement between the pipe end and coupling member to accommodate the ordinary expansion and contraction.

In carrying my invention into effect I preferably provide the pipe end with an annular locking projection, adapted to engage an annular shoulder provided on a member of the coupling, and so constructed that after the parts of the coupling are assembled, the engagement of said annular projection with said shoulder will positively prevent the withdrawal of the pipe end from the enclosing cylindrical member. Specifically, I find it convenient to provide the pipe end with the annular locking projection by forming an annular groove in the pipe section at the proper distance from the end thereof and to provide the enclosing member of the coupling with a cooperating annular shoulder, and to employ, in connection therewith, a spring split ring or snap ring having an internal diameter, less than the external diameter of the pipe, and somewhat greater than the diameter of the pipe at the bottom of the annular groove therein, said split ring being capable of being passed over the end of the pipe and allowed to contract into the annular groove therein. The spring split ring is snapped into the groove in the pipe and compressed into the groove to enable the pipe and split ring to be inserted within the enclosing member of the coupling, until the spring split passes the adjacent annular locking projection of the enclosing member, when it expands and interlocks therewith while remaining in interlocking engagement with the groove in the pipe section, and thus locking the pipe section to the enclosing member. The groove in the pipe is preferably made of greater width in the direction of the longitudinal axis of the pipe than the locking ring, so that a limited amount of movement of the pipe with respect to the ring is permitted for the purpose of accommodating expansion and contraction.

In the accompanying drawing, which illustrates several embodiments of my invention, Fig. 1 represents an elevation, partly in section, of a coupling of the well known Dresser type, having my invention embodied therein.

Figure 2:
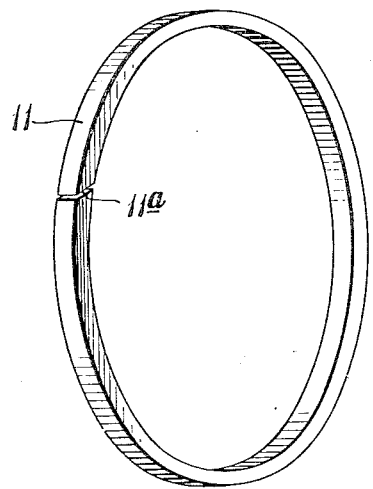

Fig. 2 is a detail perspective view of the split spring locking ring shown in Fig. 1.

In the form of my invention illustrated in Figs. 1 and 2 I have shown my invention embodied in a coupling for two plain end pipe sections of the well known Dresser type, in which 1, represents a middle ring or coupling sleeve having cylindrical portions at each end to enclose the end portion of a pipe section, the pipe sections being indicated at 2, 2. The middle ring is provided at each end with an outwardly flared portion, indicated at 3, to form a packing recess around the enclosed pipe section, and the middle ring is also ordinarily provided with a centering stop, in this instance an inwardly projecting annular rib or bead, indicated at 4, to assist in centering the middle ring with respect to the joint. 5, 5, represent the clamping rings or followers, each of which is provided with an annular flange, 6, projecting on one side of the ring to form a packing recess, and the clamping rings are also provided with circular series of bolt holes, one of which is indicated at 7, to receive the through bolts or clamping bolts, 8, provided with the usual nuts, 9. Each of the pipe sections 2, 2, as shown, is provided with an annular groove or recess, 10, which may be conveniently formed therein at the factory where the pipe sections are manufactured. The grooves may be formed by turning or in any other desired manner.

As herein shown, the middle ring, 1, is provided adjacent to each end, at a suitable distance from the centering stop, 4, with an annular locking shoulder, indicated at 12, preferably formed by making the interior diameter of the middle ring between the locking shoulder and the centering stop, of slightly greater diameter than the portions of the middle ring, adjacent to the flared end portions, 3, which form the end packing recesses of the middle ring. For convenience in assembling, the interior diameter of each of the spring locking rings, 11, is made somewhat greater than the diameter of the pipe at the bottom of the locking recess, as indicated in Fig. 1, so that while the rings engage the locking recesses, they can be compressed slightly therein, to enable them to be inserted with the pipe end into the appropriate end of the middle ring. In thus assembling the pipe sections and locking rings with respect to the middle ring, the flaring end portions 3, of the middle ring, co-operate in compressing the spring split locking rings, so that they may be forced past the portion of the middle ring adjacent to the packing recesses, and into engagement with the central portion of the middle ring of greater internal diameter, when the split rings will expand sufficiently to engage the locking shoulders, 12. In the construction shown in Fig. 1, the packing rings, indicated at 13, may be of the usual form to fit the packing recesses in the ends of the middle ring, and the adjacent packing recesses in the coupling rings, 5.

It will be noted that each pipe section is positively connected with the surrounding or enclosing member by the split ring itself, as soon as the parts have been assembled, and quite independently of the means by which the joint is packed, and in the embodiment of my invention shown in Fig. 1, the two pipe sections are positively connected with the integral middle ring or sleeve, and are thus connected to each other, so that they cannot be disassembled. It will be understood that before the parts of the coupling are assembled, a clamping ring and packing ring will be placed in engagement with each of the pipe sections, and moved to a position more remote from the end thereof than the groove, 10, after which the spring split locking ring, 11, will be sprung over the pipe end and placed in engagement with the groove. After the ends of the pipe sections so provided with the spring split locking rings are placed in proper relation within the ends of the middle ring and locked thereto, as before described, the clamping rings will be moved up until their annular flanges, 6, enclose the packing rings and press the latter into the packing recesses of the middle ring. The through bolts are then passed through the corresponding bolt holes in the clamping rings, 5. The nuts, 9, are applied thereto and turned to complete the coupling of the pipe sections.

It will be seen that the packing rings will be compressed within the packing recesses of the middle ring and clamping ring, so as to form a gas-tight joint, and the engagement of the locking rings with the locking faces of the pipe sections and the enclosing member, i. e., the middle ring, will prevent either of the pipe sections from being withdrawn from, or forced out of the enclosing member, in any manner. At the same time the pipe sections move longitudinally sufficiently to accommodate ordinary expansion and contraction due to variations in temperature.

With the construction shown, it will also be seen that the pipe sections are locked together, through the enclosing member of the clamping rings, that is whether the bolts are inserted or not, and whether the packings are tight or not. Thus, where it may be necessary to move a number of pipe sections connected by the spring split locking rings, longitudinally, this can be drawn without withdrawing any of the pipe sections from the adjacent coupling members, and this is a matter of considerable convenience in the laying of pipe lines. This construction is also well adapted for making connections which it is desired to prevent tampering with, as the pipe sections cannot well be separated without destroying the enclosing member, as it would be practically impossible to release the spring split locking rings, in situ, after the parts of the coupling are assembling.

It will be understood that while I have shown my invention applied to a coupling for the adjacent plain end of two pipe sections, it is equally applicable to corresponding pipe couplings of the bell and spigot type. For example, the end portion of the middle ring, might equally well represent the bell end of an adjacent pipe section, provided with the usual means for engaging the clamping bolts for compressing the elastic packings.

What I claim and desire to secure by Letters Patent is:

1. In a pipe coupling for plain end pipes, the combination with an integral middle ring provided at each end with a packing engaging portion, and having its inner surface provided on opposite sides of its longitudinal center with an integral annular shoulder, disposed substantially perpendicular to the axis of the ring, a pair of packing rings, a pair of clamping rings provided with portions for directly engaging said packing rings, a pair of plain end pipe sections provided each with an annular locking groove and an integral spring split locking ring in each of said locking grooves for engaging a locking shoulder of the middle ring, and clamping bolts for connecting said clamping rings.

2. In a pipe coupling for plain end pipes, the combination with an integral middle ring provided at each end with a packing engaging portion, and having its inner surface provided on opposite sides of its longitudinal center with an integral annular shoulder, disposed substantially perpendicular to the axis of the ring, a pair of packing rings, a pair of clamping rings provided with portions for directly engaging said packing rings, a pair of plain end pipe sections provided each with an annular locking groove and an integral spring split locking ring in each of said locking grooves for engaging a locking shoulder of the middle ring, said locking rings having their normal inner diameters less than the outer diameter of the pipe but greater than the diameter of the bottom of the locking groove therein, and their outer diameters sufficient to enable them to engage the locking shoulders of the integral middle ring, and clamping bolts for connecting said clamping rings.

3. In a pipe coupling, the combination with a cylindrical enclosing member, provided adjacent to its outer edge with packing engaging portions and at a distance from its outer edge with an interior annular locking shoulder, a cylindrical enclosed member adapted to enter said enclosing member, provided on its outer surface with an annular recess, an integral split spring locking ring for engaging said recess, having its normal internal diameter less than the outer diameter of the enclosed member, but greater than the diameter of the enclosed member at the bottom of the said locking recess, and its normal external diameter greater than the diameter of the enclosed member adjacent to said recess, and adapted to be compressed within said recess, and to spring into engagement with the locking shoulder when the parts are assembled, to positively lock the enclosing and enclosed members, an annular packing surrounding portions of the enclosed member at a greater distance from its inner end than the said annular recess, and clamping means cooperating with the packing engaging portions of said enclosing member, for compressing said packing upon the exterior of the enclosed member, while permitting relative longitudinal movement between said members.

4. In a pipe coupling, the combination with a cylindrical enclosing member provided at its outer end with an outwardly flared portion to form a packing recess, and provided internally with a portion of enlarged diameter, forming an annular locking shoulder at a distance from its outer end, a cylindrical enclosed member, adapted to enter said enclosing member provided on its outer surface with an annular locking recess, an integral split spring ring for engaging said recess having its normal internal diameter less than the external diameter of the enclosed member, but greater than the diameter of the enclosed member at the bottom of said recess, and its external diameter greater than the external diameter of the enclosed member adjacent to said recess, said ring engaging the flared portions of the enclosing member, to compress said ring within said recess and permit it to enter the enclosing member and expand into locking engagement with the locking shoulder thereof when the parts are assembled, to positively lock the enclosing and enclosed parts together, and means for packing said packing recess to form a tight joint between said enclosing and enclosed members.

In testimony whereof I affix my signature.

JAMES CLARK.